United States Patent [19]

Chiang

[11] Patent Number: 4,698,112
[45] Date of Patent: Oct. 6, 1987

[54] PROCESS APPARATUS FOR MAKING DIFFERENTLY-SHAPED POLYETHYLENE BAGS AND THE METHOD THEREOF

[76] Inventor: Chang L. Chiang, 1 Fl., No. 2-1, Lane 16, Tung Hu Road, Nei Hu District, Taipei, Taiwan

[21] Appl. No.: 850,523

[22] Filed: Apr. 11, 1986

[51] Int. Cl.⁴ .............................................. B32B 31/18
[52] U.S. Cl. .................... 156/250; 156/267; 156/510; 156/516; 493/199; 493/200; 493/201; 493/203; 493/210
[58] Field of Search ............... 156/250, 251, 261, 264, 156/267, 510, 516; 493/186, 189, 199, 200, 201, 203, 210

[56] References Cited

U.S. PATENT DOCUMENTS

| | | | |
|---|---|---|---|
| 3,318,748 | 5/1967 | Hurst | 156/267 |
| 3,748,205 | 7/1973 | Adams | 156/267 |
| 4,114,520 | 9/1978 | Achelpohl et al. | 493/199 |
| 4,332,578 | 6/1982 | van der Meulen | 156/267 |

FOREIGN PATENT DOCUMENTS

2032344  5/1980  United Kingdom ............... 156/267

Primary Examiner—Caleb Weston

[57] ABSTRACT

An apparatus for producing various shapes of polyethylene bags includes a heating mold separating means, a cutting mold separating means and a collecting means. By using such an apparatus for making PE bags, a double-layered polyethylene sheet rolled on a roller is transported into the heating mold separating means by input rollers to form polyethylene bags of any desired shape. Since the bags can not be completely separated from the sheets by heating mold, the bags together with the sheets must be sent into the cutting mold separating means by transporting rollers again. The cutting mold separating means will cut the boundary of the bag except the root portion, so that the bag is completely separated from the sheets, except for the root portion. Finally, the bags together with the sheets are sent into the collecting means. The cutter of the collecting means indents the root portion of the bags and the needles of the collecting means pokes through the root portion of the bags. Therefore, the bags are produced and completely separated from the sheets and then collected in the collecting means. Further, the waste sheets are transported by output rollers to a waste sheet collecting roller for reuse.

2 Claims, 8 Drawing Figures

PROCESS APPARATUS FOR MAKING DIFFERENTLY-SHAPED POLYETHYLENE BAGS AND THE METHOD THEREOF

BACKGROUND OF THE INVENTION

In recent years, polyethylene bags have been used for packing articles such as food and toys. These polyethylene bags are always made in a rectangular form. Since the shape of the bags are fixed, the polyethylene bags can not beautify the appearance of the articles to attract the attention of the users. It has been previously known in prior arts that producing polyethylene bags always utilizes a heating mold to apply heat to the polyethylene sheets to form the rectangular bags. The bags then have to be cut for separation from the sheets by hand-working. Finally, those bags are collected and counted manually. However, there are still defects existing in the current methods for making PE bags, such as:

(1) After the heating mold forms a rectangular bag, the bag must be separated from polyethylene sheets manually. Therefore, the efficiency of this process is very low;

(2) Polyethylene sheets are heated to form the bags. The boundary of the bags adhere to the polyethylene sheets at the heating line. Meanwhile, the polyethylene sheet is always made of two thin layers, to thereby be easily broken when tearing off the bag from the sheets; and (3) When the workmen collect the produced bags, they must count the number of the bags and neatly arrange them. Since the current bag is so thin and soft, its manufacturing process becomes more difficult and will cost much labor and time.

SUMMARY

It is the primary object of the present invention to provide a method of producing various shapes of polyethylene bags and equipment to implement the method which can prevent the defects of the prior arts.

It is the further object of the present invention to provide a heating mold separating means and a cutting mold separation means such that the bags depart from the sheets automatically.

It is the other object of the present invention to provide a collecting means to count and collect the bags automatically.

BRIEF DESCRIPTION OF THE DRAWINGS

FIG. 3A is a perspective view showing a heating mold secured under a fixing mold plate in accordance with the present invention.

DETAILED DESCRIPTION OF THE DRAWINGS

Figure 1:
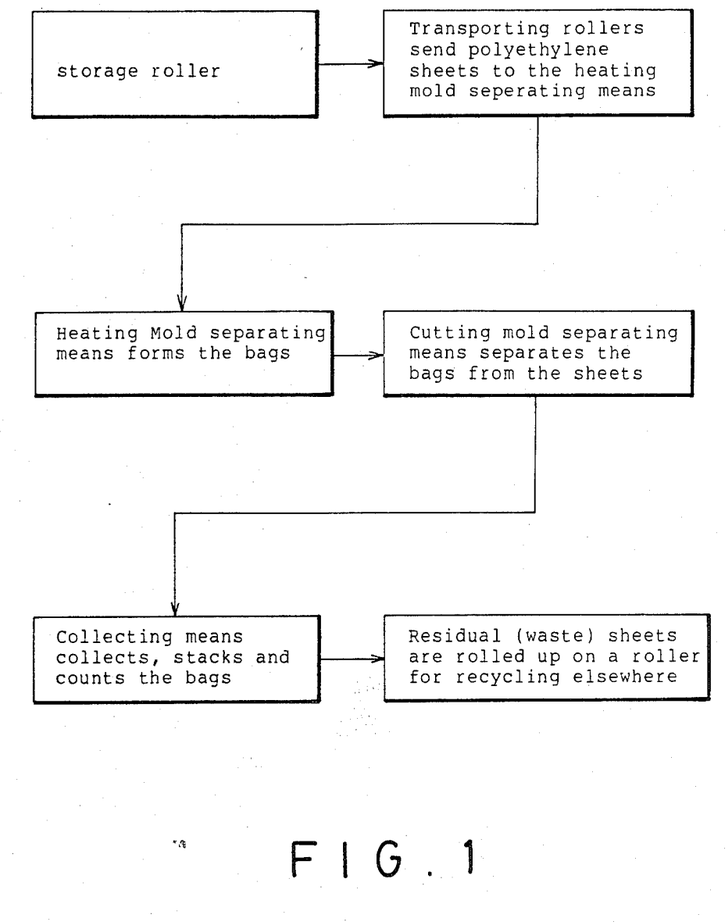
FIG. 1 shows a schematic diagram of the process of the present invention.
Figure 2:
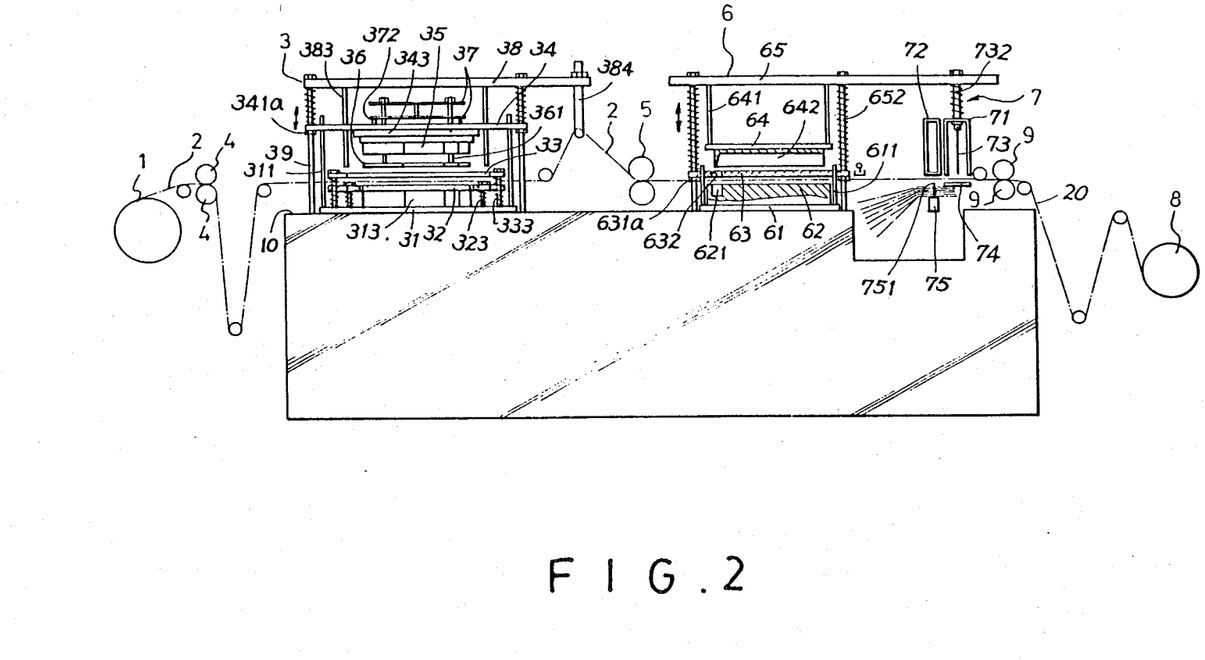
FIG. 2 is a frontal view of the equipment which produces the various shaped polyethylene bags according to the present invention.

Referring to FIG. 1 and FIG. 2; it can be seen that a double-layer polyethylene (PE) sheet 2 composed of two layers of PE film is prerolled on a store roller (1). The sheet 2 is fed into the heating mold separating means (3) by input rollers (4). The heating mold separating means (3) has a set of molds which form bags as the desired shape and partially separate the bags from the sheet (2). A pair of transporting rollers (5) transport the sheet (2) together with the bags into the cutting mold separating means (6). The cutting mold separating means (6) completely separates the bags from the sheet (2) except for the root of the bags. Then, the sheet (2) together with the bags are sent into the collecting means (7). The collecting means (7) indents the roots of the bags so that the bags completely separate from the sheets (2) to be collected therein. The scrap (2) pass through the collecting means (7) directly. Finally, the scrap 20 (2) are transported to the roller (8) by output rollers (9) to be collected for use elsewhere.

Figure 3:
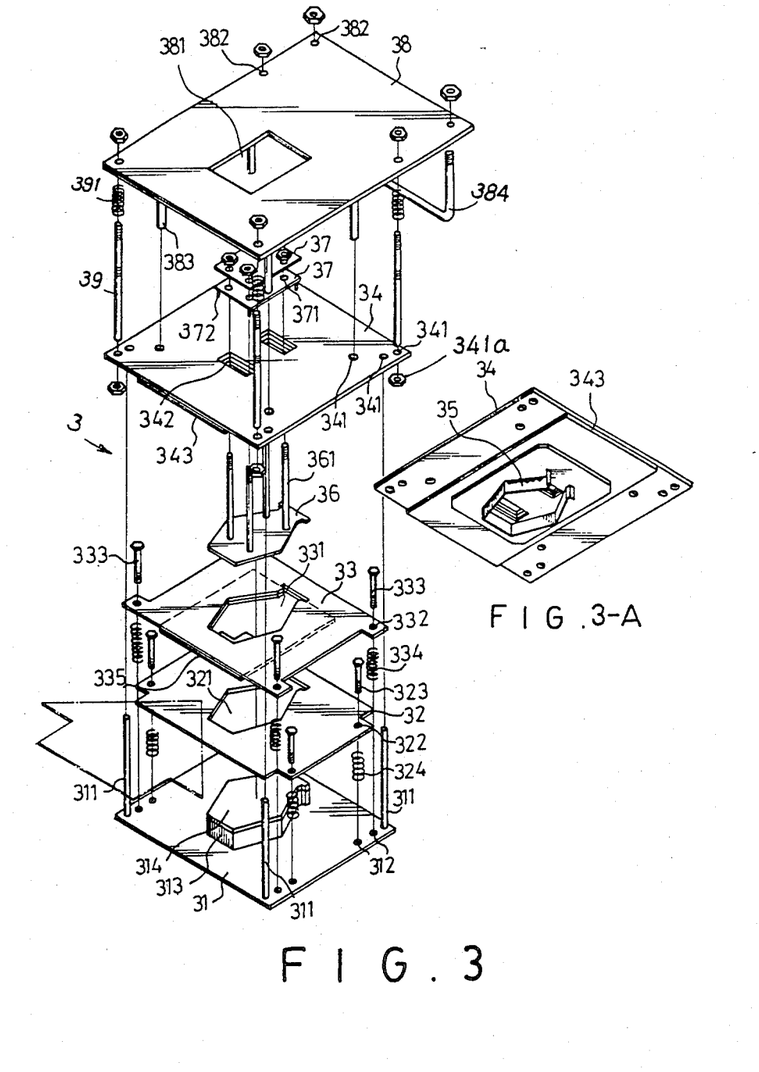
FIG. 3 is an exploded view of the heating mold separating means of the present invention.

Referring to FIG. 3 and FIG. 2, the heating mold separating means (3) comprises a base plate (31) with a lower mold (313), a heat-resistant plate (314), a pair of outer mold plate (32) and (33), a fixing mold plate (34) with a heating mold (35) and a heat-resistant plate (343), a press-plate (36), a pair of securing plate (37), an upper plate (38) and four driving rods (39). The base plate (31) mounted on the machine body (10) has two apertures (312) and one standing rod (311) (which extends upward) at each corner. The lower mold (313) and the heat-resistant plate (314) are mounted on the base plate (31) and have the same shape as the desired shape of the bags. Both outer mold plates (32) (33) are each formed a molding hole (321) or (331) which has the same shape as the lower mold (313), so that the lower mold (31) can be pressed through the molding holes (321) (331) when the outer mold plates (32) (33) are pressed downwards. Each corner of either outer plate 32 or 33 is respectively formed an aperture 322 or 332 for inserting a screw rod 323 or 333 which is jacketed with a spring 324 and 334 for resiliently mounting the plate 32 or 33 on the base plate 31. The screw rods (323) and (333) pass through the apertures (322) and (332) of the outer mold plates (32) and (33) and the apertures (313) of the base plate (31) to be secured in the machine body (10). A pressing plate (335) is mounted on the bottom surface of the upper outer mold plate (33) and has the same hole as the molding hole (331) of the outer mold plate (33). When the outer mold plates (32) and (33), together with pressing plate (335), are pressed downwards, the sheet 2 is closely pressed between these plates (32), (33) and (35) to prevent them from wrinkling. The fixing mold plate (34) has three apertures (341) at each corner, and also has two square holes (342) at its middle portion. One of the three apertures (341) at each corner allows the driving rods (39) to pass therethrough, another aperture allows the standing rod (311) of the base plate (31) to pass therethrough and the third one allows the press rod (383) of upper plate (38) to pass therethrough. The fixing mold plate 34 is lowerly limited by four nuts 341a each fixed on each rod 39 under the plate 34. Referring to FIG. 3-A, it can be seen that the heat-resistant plate (343) and heating mold (35) are mounted on the bottom surface of the fixing mold plate (34). The shape of the heating mold (35), of course, is the same as the shape of the lower mold (313). The press-plate (36) has four rods (361) which extend upwards through the square holes (342) to pass through the apertures (371) which are bored at the four corners of each of the two securing plates (37) partitioned with each other for the reciprocative movement of plate 36. The shape of the press-plate (36) is slightly smaller than the shape of the heating mold (35), so that the press-plate (36) can be protruded downwards the heating mold (35). The lower securing plate (37) has one leg (372) at each of its corners, each leg is fixed on the upper surface of the fixing mold plate (34). The upper plate (38) has one hole (381) which allows the securing plates (37) to pass through when the upper plate (38) is driven downwards. The upper plate (38) also has four press rods (383) which extend downward to contact with and press the outer mold plates (33) (32) for descending. Further, the upper plate (38) has six apertures (382). Two of the apertures (382) allow a U-shaped rod (384) to be fixed for slidably hanging the sheets (2) on the right side. The four remaining apertures (382) allow the driving rods (39) to be fixed. Each of the driving rods (39) is encompassed by a spring (391). The bottom ends of the driving rods (39) are reciprocatively mounted in the machine body (10) to be driven upwards or downwards.

The sheets (2), which are transported by the input rollers (4), are sent into the outer mold plates (32) and (33) to be positioned therebetween. The driving rods (39) are lowered to drive the upper plate (38), the fixing mold plate (34), the heating mold (35) and pressing plate (36 downwards). The press rods (383) contact with the outer mold plates (33) and (32) and drive them downwards. Further, the heating mold (35) presses the PE sheet through the molding holes (331) and contacts with the lower mold (313) to thermally seal the contour of a bag to be made, upon the depression of the press plate 36 on the PE sheet as padded by the lower mold 313. The boundary scrap 20' will be re-adhered with the sheet 2 after being pressed by the pair of transporting rollers 5 so that a post-treatment to further separate the scrap from the bag is necessary, such that the sheet is fed into the cutting-mold separating means 6 by the rollers 5.

Figure 4:
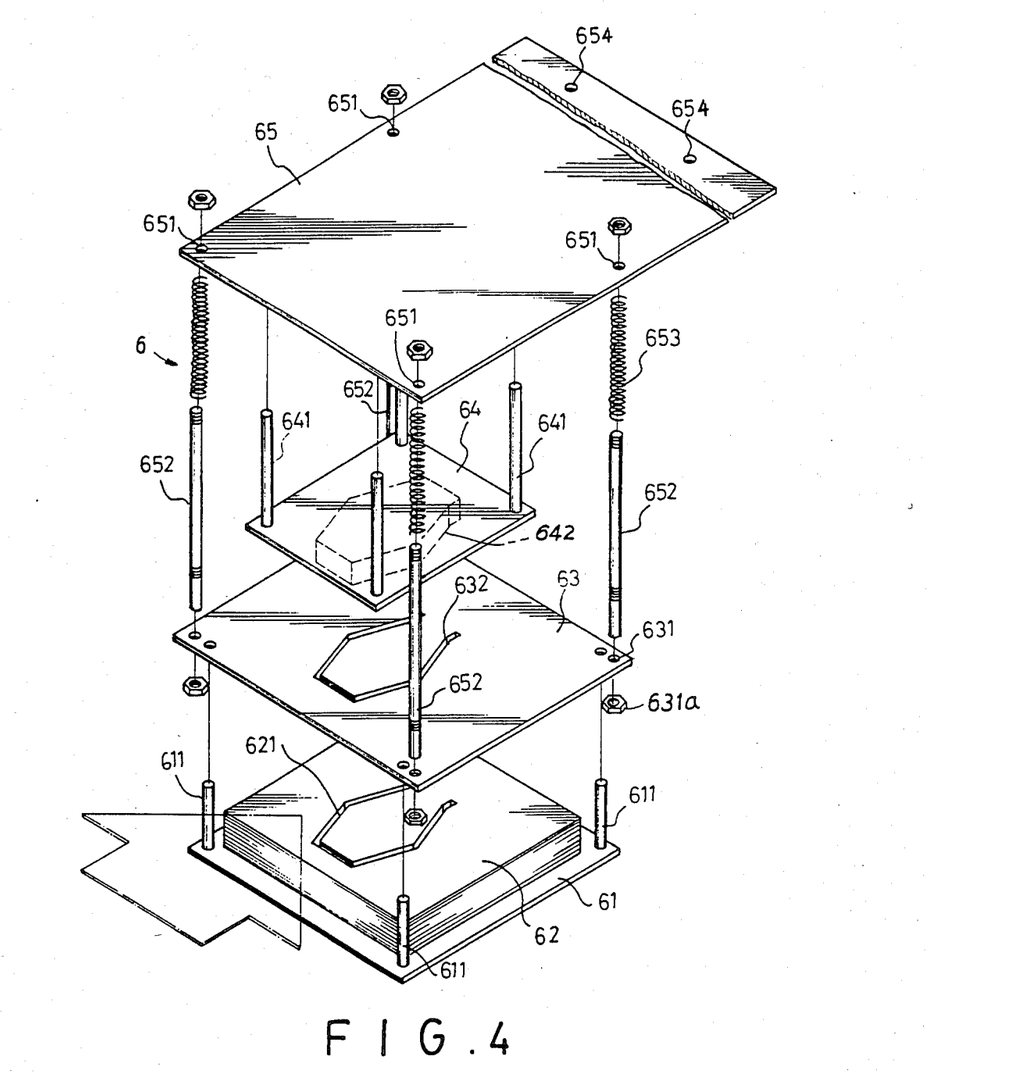
FIG. 4 is an exploded view of the cutting mold separating means of the present invention.

Referring to FIG. 4 and FIG. 2, it can be seen that the cutting mold separating means (6) comprises a base plate (61), a lower mold (62), a press-plate (63), an upper mold plate (64) and an upper plate (65). The base plate (61) is mounted on the machine body (10). Each corner of the base plate (61) has a standing rod (611). The lower mold (62) mounted on the base plate (61) has a molding slot (621) at the middle portion. The shape of the molding slot (621) is similar to the shape of the bags. The press-plate (63) has two apertures (631) at each corner and one molding slot (632) at middle portion. The shape of the molding slot (632) is also similar to the shape of the bags. One of the apertures (631) at each corner receives the standing rods (611) of the base plate (61). The upper mold plate (64) has one standing rod (641) at each corner extending upward so as to engage with the upper plate (65). A cutting mold 642 is fixed on the bottom surface of the upper mold plate (64). The shape of the cutting mold (642) is similar to the shape of the molding slots (632) and (621), so that the cutting mold (642) may pass through the molding slots (632) and (621) for cutting a bag when the cutting mold (642) descends. The upper plate (65) has four apertures (651) which receive the driving rods (652). Each driving rod (652) has a spring (653) disposed around it and each passes through the aperture (651) of the upper plate (65 for fixing the upper plate 65) and the other aperture (631) at each corner of the press-plate (63) whereby a nut 631a is fixed on each rod 652 under the plate 63 to limit the lowering of the plate 63. The bottom ends of the driving rods (652) are engaged in the machine body (10) (not shown) and can be driven upwards or downwards. Additionally, the right portion of the upper plate (65) has another two apertures (654) for engaging with the collecting means (7).

When the driving rods (652) are driven downwards, the rods (652) drive the upper plate (65), the upper mold plate (64) and the press-plate (63) downwards. Further, the cutting mold (642) lowers and passes through the molding slots (632) and (621) to cut the sheets (2) which are sent into the space between the press-plate (63) and the lower mold (62), so that the bag separates from the sheets (2) except for the root portion (right side) of the bag which is still connected to the sheets. Finally, the driving rods 652 are restored upwards to raise the upper plate (65), the upper mold plate (64) and the press-plate (63). Then, the sheets (2), together with the bags, are transported to a collecting means (7).

Figure 5:
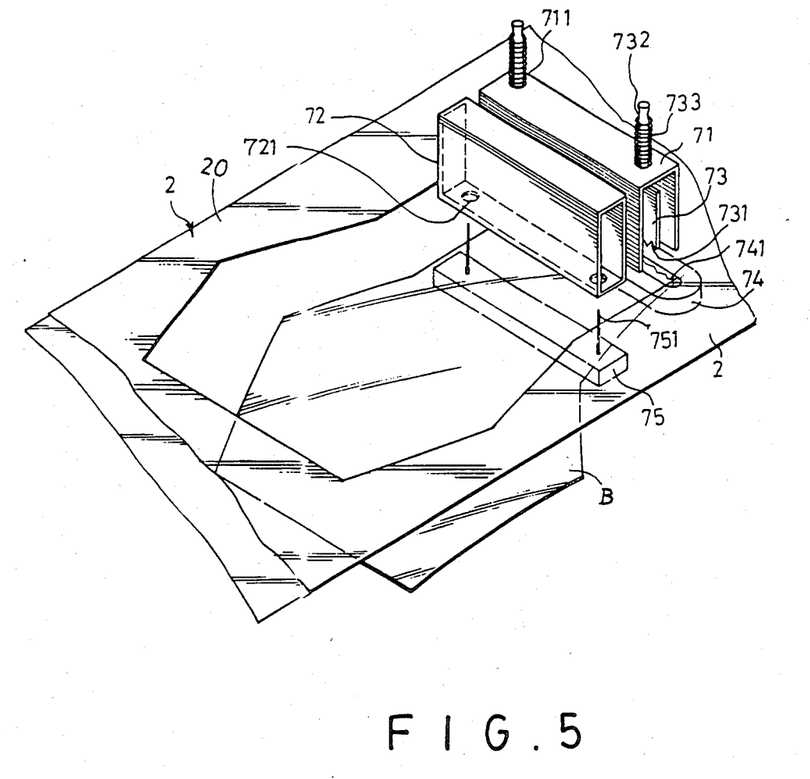
FIG. 5 is a perspective view of the main structure of the collecting means of the present invention.

Referring to FIG. 5 and FIG. 2, it can be seen that the collecting means (7) comprises a n-shaped plate (71), a rectangularly-shaped shell (72), a cutter (73), a base seat (74) and a collecting seat (75). The n-shaped plate (71) and the rectangularly-shaped shell (72) are adjacent to each other and are connected. The n-shaped plate (71) has two apertures (711) on its upper side. The bottom end of the cutter (73) has cutting teeth (731) which cut the root portion of the bag. The top part of th cutter (73) is fixed to two rods (732) which pass through the apertures (711) of the n-shaped plate (71) and are encompassed by a spring (733). The rods (732) are engaged with the right portion of the upper plate (65). The rectangularly-shaped shell has two apertures (721) on its bottom side. The rectangularly-shaped shell (72) is elevated or lowered together with the n-shaped plate (71). The base seat (74) disposed below the n-shaped plate (71) has a slot (741) in its middle portion. The collecting seat (75) disposed below the rectangularly-shaped shell (72) has two needles (751) extending upward.

When the bags are sent into the collecting means (7), the n-shaped plate (71) and rectangularly-shaped shell (72) lower, so that the cutter (73) lowers together with the n-shaped plate (71) to cut the root portion of the bag and thereby separate the bag from the sheets (2). Further, the needles (751) of the collecting seat (75) poke through the root portions of the bags and the apertures (721) of the rectangularly-shaped shell (72) to collect the bags. The waste sheets (2) are then transported out by the output rollers (9) to be collected on the scrap roller (8) for use elsewhere. The cutter 73 is synchronously operated with the cutting operation of the cutting mold 642 due to their common upper plate 65.

Figure 6:
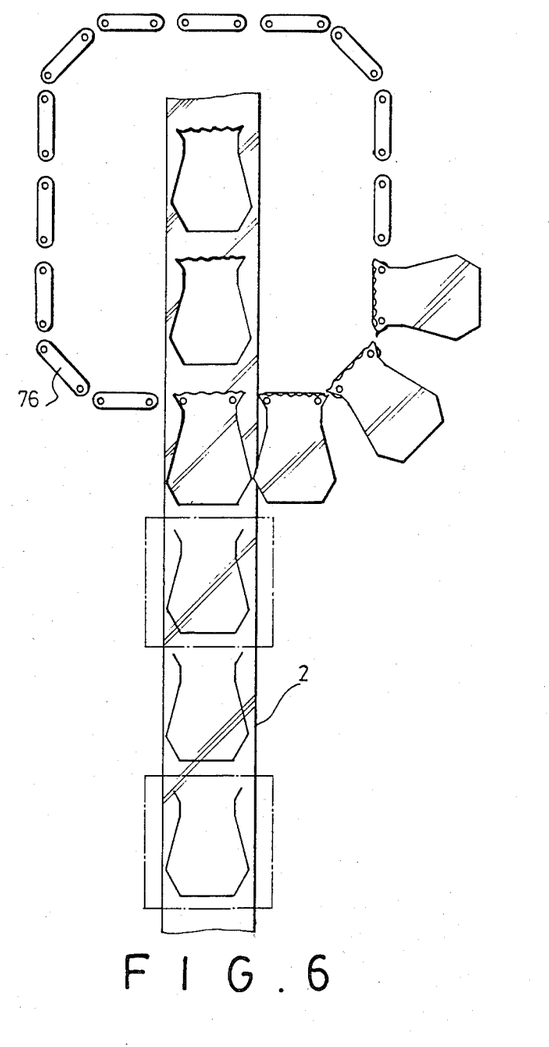
FIG. 6 is a bottom side view of the collecting means which shows the collecting means driven by a chain to collect the bags.

Referring to FIG. 6 it can be seen that a rotating chain (76) supports several sets of collecting means (7) and rotates intermittently, so that the bags are neatly collected and stacked, so as to be easily countable. For example, if the rotating chain (76) rotates 100 cycles, then 100 bags are collected on each collecting means (7). That is, the number of cycles of the rotating chain (76) is the same as the number of the collected bags.

Figure 7:
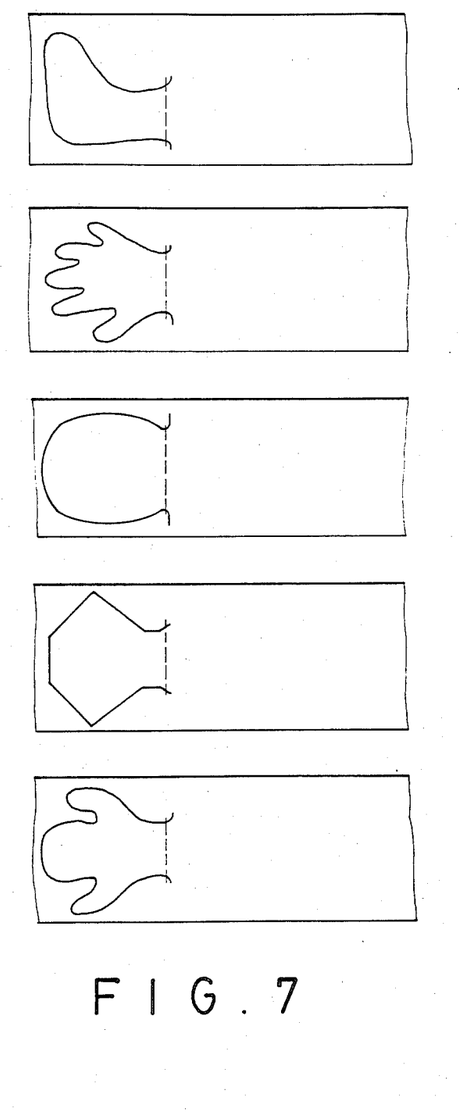
FIG. 7 shows that the bags can be formed as various shapes by the present invention.

Furthermore, as described above, various shapes of polyethylene bags (such as those shown in FIG. 7) can be easily produced and the number of the produced bags can be easily counted in order to produce the plyethylene bags automatically and efficiently.

While the invention has been particularly shown and described with reference to the foregoing preferred embodiment, it will be understood by those skilled in the art that other changes in form and detail may be made therein without departing from the spirit and scope of the invention as defined in the claims.

I claim:

1. An apparatus for making differently-shaped polyethylene (PE) bags comprising:
   a store roller pre-rolled with a double-layer polyethylene sheet composed of two layers of polyethylene film, pertinent thereto a pair of input rollers provided for feeding said double-layer PE sheet into a heating-mold separating means;
   a heating-mold separating means including:
   a base plate mounted on a machine body of the apparatus having four standing rods respectively extending upwards from the four corners of said base plate, a lower mold having a heat-resistant plate mounted thereon formed on said base plate having a shape corresponding to that of a bag to be made, two outer mold plates each having a molding hole slightly larger than the shape of said lower mold and each resiliently mounted on said base plate above said lower mold of which said two outer mold plates are adapted for feeding said PE sheet therebetween, a fixing mold plate having a heat-resistant plate and a heating mold fixed thereunder to correspond said lower mold and slightly smaller in shape than that of the lower mold and having four apertures reciprocatively engaged with said four standing rods of said base plate and resiliently jacketed on four driving rods to be positioned above said two outer mold plates as lowerly limited by nuts fixed on each driving rod, a press plate adapted to downwards press the PE sheet for making a bag having a shape slightly smaller than that of the heating mold and protruding downwards said heating mold and having four rods upwards to pass through two securing plates partitioned with each other through two square holes formed on said fixing mold plate of which the lower securing plate is formed with four legs secured to said fixing mold plate, and an upper plate having a hole adapted for passing said securing plates when lowering the upper plate and fixed on the top ends of the four driving rods which are operatively reciprocatively mounted in the machine body whereby upon the lowering of said upper plate and the fixing mold plate, the heating mold will contact the PE sheet as padded by the lower mold to thermally seal the contour of a bag, and having four press rods extending downwards from said upper plate to pass through said fixing mold plate to operatively depress said two outer mold plates downwards for separating boundary scrap from a thermally-sealed bag (scrap already clamped by two outer mold plates), and a U-shaped rod fixed on a right side of said heating-mold separating means adapted for slidably hanging the PE sheet leaving from said heating and lower molds;
   a cutting-mold separating means including a base plate fixed on the machine body having four standing rods extending upwards from said base plate, a lower mold fixed on said base plate having a molding slot formed on its middle portion with a shape corresponding to a bag to be made, a press plate having a molding slot formed on its middle portion with a shape corresponding to a bag and jacketed on the four driving rods, which are operatively reciprocatively mounted in the machine body, as lowerly limited by four nuts each fixed on each driving rod under said press plate, an upper mold plate secured under an upper plate which is mounted on the top ends of said driving rods as restored by four springs each jacketed on each said driving rod as defined between said upper plate and said press plate and having a cutting mold formed on the bottom of said upper mold plate with a shape corresponding to a bag, whereby the PE sheet is fed through a pair of intermittently-operated transporting rollers to pass through said press plate and said lower mold to be cut for forming a bag except its root portion by said cutting mold upon the lowering of said upper plate and said upper mold plate; and
   a collecting means including a n-shaped plate resiliently secured under said upper plate of said cutting-mold separating means as restored downwards by springs jacketed on two rods connected between said upper plate and a cutter reciprocatively moving within the n-shaped plate having cutting teeth formed on its lower end of said cutter, a base seat positioned under said cutter having a slot thereon corresponding to the cutting teeth of said cutter for cutting the root portion of a bag when lowering said cutter against said base seat, a rectangular-shape shell adjacent to said n-shaped plate having two apertures on its bottom, a collecting seat positioned under said rectangular-shaped shell and having two needles extending upwards from said shell adapted to poke a bag as passing through said shell and said collecting seat into said two apertures formed on said shell upon the lowering of said shell, for collecting the cut bags, and a scrap roller rolling up the scrap after removing the cut bags through a pair of intermittently-operated output rollers.

2. A method for making polyethylene bags comprising the following steps by using an apparatus having the limitations as set forth in claim 1:
   (A) Feeding a double-layer polyethylene sheet composed of two layers of PE film into said heating-mold separating mold; (B) By depressing the press plate and heating mold downwards upon the PE sheet between said two outer mold plates as padded by the lower mold to thermally seal the contour of bag, and by depression of the upper plate and the press rods to press the two outer mold plates to separate the boundary scrap from the bag formed between the heating mold and the lower mold except its root portion;
   (C) Slidably hanging said PE sheet having said bag formed thereon on a U-shaped rod fixed on the right side of said separating means;
   (D) Feeding the PE sheet having formed bag with scrap into said cutting-mold separating means and further ensuring cutting of said PE bag except its root portion by said cutting mold; and
   (E) Synchronously cutting the root portion of each bag by said cutter of said collecting means and poking each bag by said needles of said collecting seat for collecting finished bags and rolling up the boundary scrap by a scrap roller.

* * * * *